United States Patent
Murata (10) Patent No.: US 9,710,409 B2
(45) Date of Patent: Jul. 18, 2017

(54) INTERRUPT CONTROL APPARATUS AND INTERRUPT CONTROL METHOD

(71) Applicant: FUJITSU LIMITED, Kawasaki-shi, Kanagawa (JP)

(72) Inventor: Takehiko Murata, Kahoku (JP)

(73) Assignee: FUJITSU LIMITED, Kawasaki (JP)

(*) Notice: Subject to any disclaimer, the term of this patent is extended or adjusted under 35 U.S.C. 154(b) by 386 days.

(21) Appl. No.: 14/267,982

(22) Filed: May 2, 2014

(65) Prior Publication Data
US 2014/0359187 A1    Dec. 4, 2014

(30) Foreign Application Priority Data
May 28, 2013    (JP) ................ 2013-112314

(51) Int. Cl.
*G06F 13/24*    (2006.01)
*G06F 9/54*     (2006.01)

(52) U.S. Cl.
CPC ............ *G06F 13/24* (2013.01); *G06F 9/54* (2013.01)

(58) Field of Classification Search
CPC .. G06F 13/24; G06F 13/32; G06F 2213/2412; G06F 2213/2414; G06F 2213/2416; G06F 2213/2418; G06F 9/54; G06F 9/541; G06F 9/544; G06F 9/546
See application file for complete search history.

(56) References Cited

U.S. PATENT DOCUMENTS

| | | | | |
|---|---|---|---|---|
| 5,696,923 A * | 12/1997 | Robertson | ............... | G06F 3/14 711/100 |
| 5,812,875 A * | 9/1998 | Eneboe | ............... | G06F 13/14 710/1 |
| 5,925,115 A * | 7/1999 | Ponte | ............... | G06F 13/26 710/260 |
| 6,163,829 A * | 12/2000 | Greim | ............... | G06F 13/24 710/260 |
| 6,279,046 B1 * | 8/2001 | Armstrong | ............... | G06F 9/542 703/16 |
| 2002/0042856 A1 * | 4/2002 | Hartwell | ............... | G06F 13/24 710/263 |
| 2004/0243687 A1 | 12/2004 | Sakaguchi | | |
| 2005/0021893 A1 * | 1/2005 | Park | ............... | G06F 13/26 710/260 |
| 2006/0085582 A1 * | 4/2006 | Shikano | ............... | G06F 13/24 710/260 |
| 2006/0200610 A1 | 9/2006 | Yasue et al. | | |

(Continued)

FOREIGN PATENT DOCUMENTS

JP    11-312138 A    11/1999
JP    2002-544620    12/2002
(Continued)

OTHER PUBLICATIONS

"Microsoft Computer Dictionary". Fifth Edition. Microsoft Press. 2002. p. 446.*
Newton, Harry. "Newton's Telecom Dictionary". 19$^{th}$ Edition. CMP Books. 2003. p. 668.*
(Continued)

*Primary Examiner* — Thomas J Cleary
(74) *Attorney, Agent, or Firm* — Fujitsu Patent Center (57) ABSTRACT

PCI devices write an MSI message in a memory and polling routines, which are executed by CPU cores respectively, poll the memory. The polling routines poll a cause of interrupt during an interval between tasks, during an interval between threads, and during idle and cause a CPU core with the lowest load to perform interrupt processing. An IO task performs inter-task communication with another IO task by using a command queue.

10 Claims, 9 Drawing Sheets

(56) References Cited

U.S. PATENT DOCUMENTS

| | | | |
|---|---|---|---|
| 2006/0218328 A1* | 9/2006 | Vega | G06F 13/26 710/260 |
| 2006/0230240 A1 | 10/2006 | Sakaguchi | |
| 2008/0148295 A1* | 6/2008 | Freimuth | G06F 9/4856 719/324 |
| 2010/0122006 A1 | 5/2010 | Kanaya | |
| 2013/0275639 A1* | 10/2013 | Chew | G06F 13/24 710/269 |
| 2016/0188394 A1* | 6/2016 | Schumacher | G06F 11/079 714/49 |

FOREIGN PATENT DOCUMENTS

| | | |
|---|---|---|
| JP | 2004-355307 | 12/2004 |
| JP | 2006-216042 | 8/2006 |
| JP | 2010-117872 | 5/2010 |

OTHER PUBLICATIONS

English Language Translation of Japanese Laid-open Patent Publication No. 2006-216042 to Masahiro et al. Japan Platform for Patent Information. National Center for Industrial Property Information and Training. Retrieved from Internet Feb. 3, 2017. <https://www4.j-platpat.inpit.go.jp/cgi-bin/tran_web_cgi_ejje?u=http://www4.j-platpat.inpit.go>.*

Japanese Office Action mailed Nov. 15, 2016 for corresponding Japanese Patent Application No. 2013-112314, with Partial English Translation, 3 pages.

* cited by examiner

INTERRUPT CONTROL APPARATUS AND INTERRUPT CONTROL METHOD

CROSS-REFERENCE TO RELATED APPLICATION

This application is based upon and claims the benefit of priority of the prior Japanese Patent Application No. 2013-112314, filed on May 28, 2013, the entire contents of which are incorporated herein by reference.

FIELD

The embodiment discussed herein is directed to a control apparatus and a control method.

BACKGROUND

Conventionally, when a central processing unit (CPU) receives an interrupt from an interrupt controller, the CPU starts an interrupt processing handler corresponding to a cause of interrupt and performs interrupt processing.

Figure 9:
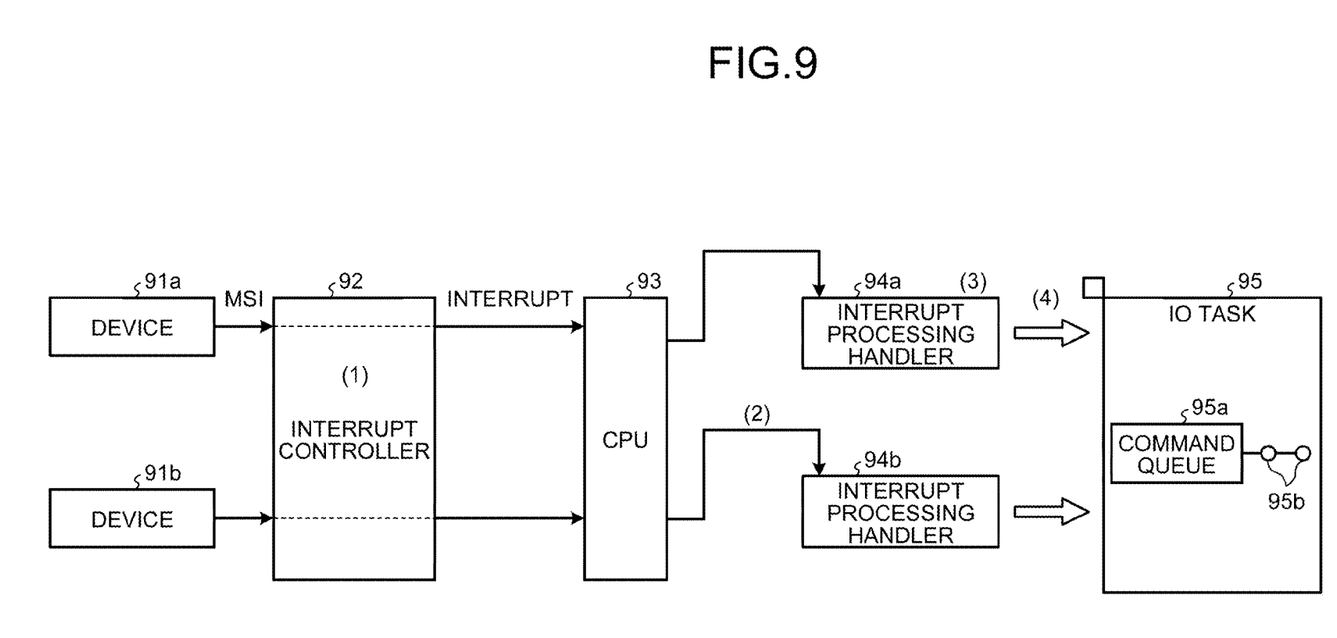
FIG. 9 is a diagram illustrating an example of conventional interrupt processing.

FIG. 9 is a diagram illustrating an example of conventional interrupt processing. FIG. 9 illustrates a case in which input/output (IO) processing is performed for an interrupt from a device. As illustrated in FIG. 9, a CPU 93 is notified of a message signal interrupt (MSI) from devices 91a and 91b through an interrupt controller 92 as an interrupt (1).

Then, the CPU 93 calls an interrupt processing handler corresponding to the cause of interrupt in order to process the interrupt (2). Specifically, when the CPU 93 receives an interrupt notification from the device 91a, the CPU 93 calls an interrupt processing handler 94a, and when the CPU 93 receives an interrupt notification from the device 91b, the CPU 93 calls an interrupt processing handler 94b.

Then, the interrupt processing handler 94a or 94b performs processing on hardware, such as clearing the cause of interrupt (3). Then, the interrupt processing handler 94a or 94b connects a command 95b corresponding to the cause of interrupt to an end of a command queue 95a of an IO task 95 (4). Then, the IO task 95 processes a first command 95b in the command queue 95a.

There is a conventional technique in which a polling memory for storing information indicating the presence of interrupt is provided in a multi-processor system and a specified processor checks the polling memory (for example, see Japanese Laid-open Patent Publication No. 2006-216042). Further, there is a conventional technique in which a bridge apparatus detects an MSI that is written to a memory by a peripheral component interconnect (PCI) device, issues a new MSI, and causes another PCI device to receive the MSI (for example, see Japanese Laid-open Patent Publication No. 2010-117872).

In recent years, a CPU installed in a control apparatus such as redundant arrays of inexpensive disks (RAID) apparatus tends to include a plurality of CPU cores. Therefore, to improve performance of the control apparatus, it is a problem to perform interrupt processing by effectively using a plurality of CPU cores.

SUMMARY

According to an aspect of an embodiment, a control apparatus includes a plurality of processing apparatuses, wherein all the processing apparatuses perform polling to monitor a cause of interrupt notified by being written in a memory and perform interrupt processing corresponding to the cause of interrupt.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The embodiment does not limit the disclosed technique.

Figure 1:
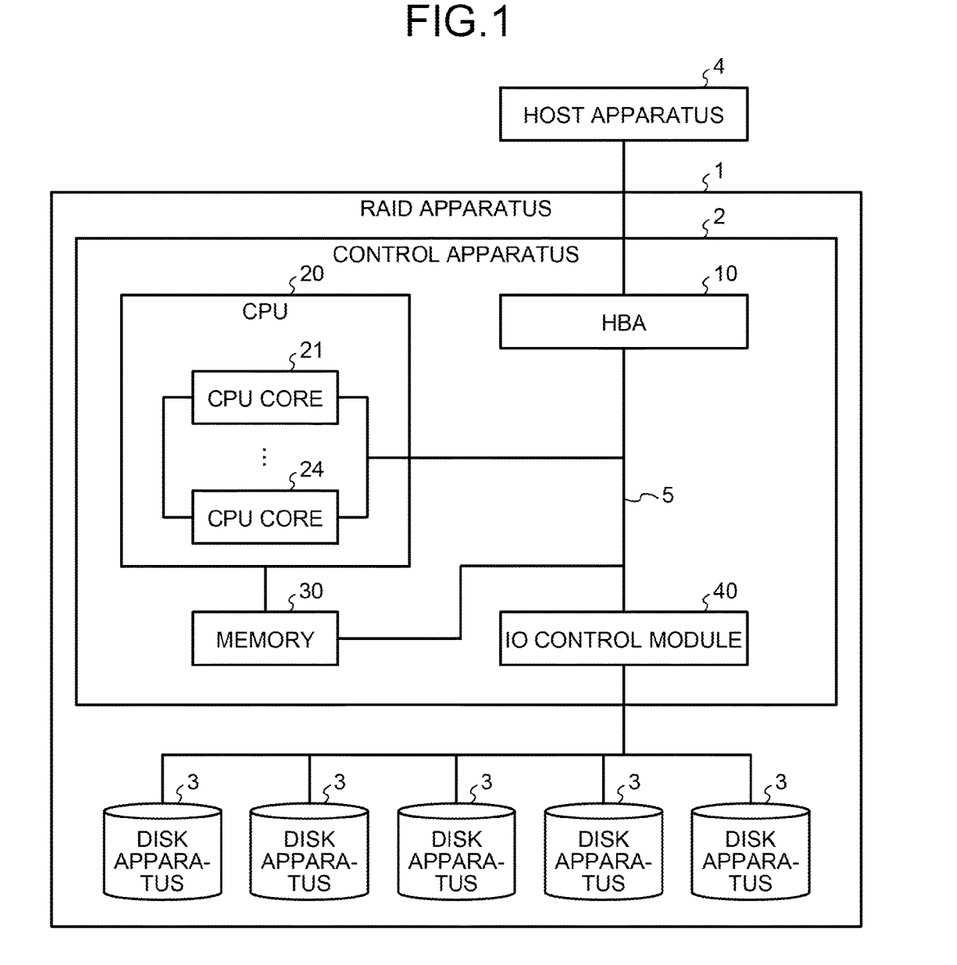
FIG. 1 is a diagram illustrating a hardware configuration of an RAID apparatus according to an embodiment.

First, a hardware configuration of an RAID apparatus according to the embodiment will be described. FIG. 1 is a diagram illustrating the hardware configuration of the RAID apparatus according to the embodiment. As illustrated in FIG. 1, a RAID apparatus 1 includes a control apparatus 2 and a plurality of disk apparatuses 3.

The control apparatus 2 is an apparatus that controls the RAID apparatus 1 and the disk apparatus 3 is an apparatus that stores data. The control apparatus 2 includes a host bus adapter (HBA) 10, a CPU 20, a memory 30, and an IO control module 40.

The HBA 10 is an interface with a host apparatus 4 and receives a command, write data, and the like from the host apparatus 4. Further, the HBA 10 returns data and the like read from the disk apparatus 3 to the host apparatus 4. Here, the host apparatus 4 is a computer such as a server.

The CPU 20 includes four CPU cores 21 to 24. Here, a case in which the CPU 20 includes the four CPU cores 21 to 24 will be described. However, the CPU 20 may include any number of CPU cores.

The CPU cores 21 to 24 are processing apparatuses that execute a real-time operating system (OS) and firmware running on the real-time OS. The CPU cores 21 to 24 are used in a symmetric multi-processing (SMP) method. Here, the SMP method is a parallel processing method by a plurality of processing apparatuses, to all of which processes are symmetrically and equally assigned.

The memory 30 stores commands and data from the host apparatus 4, data read from the disk apparatus 3, and the like. Here, the commands include a write command that instructs to write data to the disk apparatus 3 and a read command that instructs to read data from the disk apparatus 3.

The IO control module 40 controls writing and reading of data to and from the disk apparatus 3. The HBA 10, the CPU 20, the memory 30, and the IO control module 40 are connected by a PCI bus 5.

Figure 2:
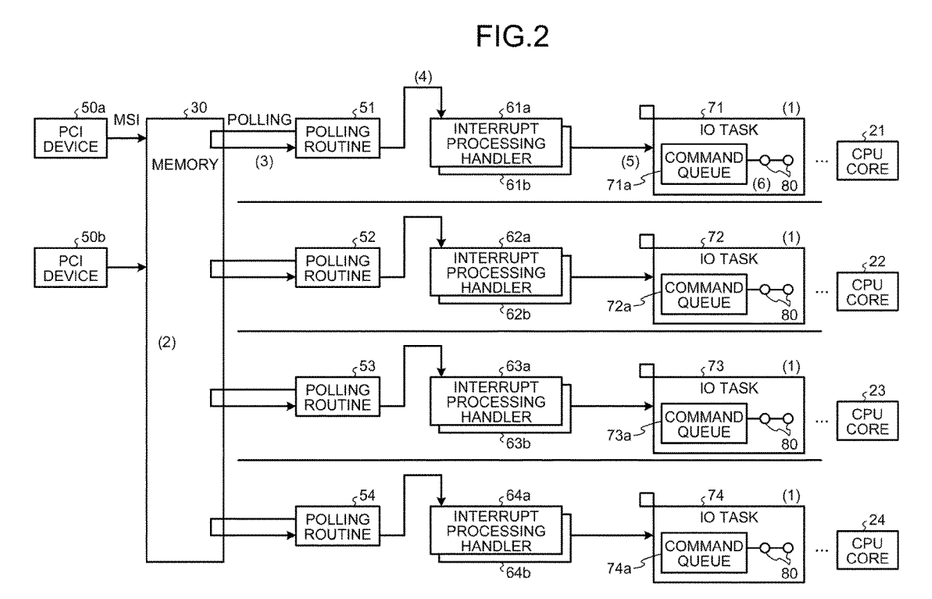
FIG. 2 is a diagram illustrating a flow of command processing performed by the RAID apparatus according to the embodiment.

Next, a flow of command processing performed by the RAID apparatus 1 according to the embodiment will be described. FIG. 2 is a diagram illustrating the flow of the command processing performed by the RAID apparatus 1 according to the embodiment. As illustrated in FIG. 2, the CPU cores 21 to 24 are associated with IO tasks 71 to 74 respectively (1).

In other words, the IO tasks 71 to 74 are performed by the CPU cores 21 to 24 respectively. Similarly, interrupt processing handlers 61a to 64a, interrupt processing handlers 61b to 64b, and polling routines 51 to 54 are executed by the CPU cores 21 to 24 respectively.

Each CPU core executes other tasks such as a network control task in addition to the IO task. Control of executing a plurality of tasks is executed by the real-time OS on the basis of task priority.

PCI devices 50a and 50b determine an interrupt destination of MSI, that is, a write destination of an MSI message, to be the memory 30 (2). Here, the PCI devices 50a and 50b are the HBA 10, the disk apparatus 3, and the like.

Here, two PCI devices 50a and 50b are illustrated. However, any number of PCI devices writes an MSI message in the memory 30. Each PCI device writes the MSI massage in an area defined for each PCI device in the memory 30.

Figure 3:
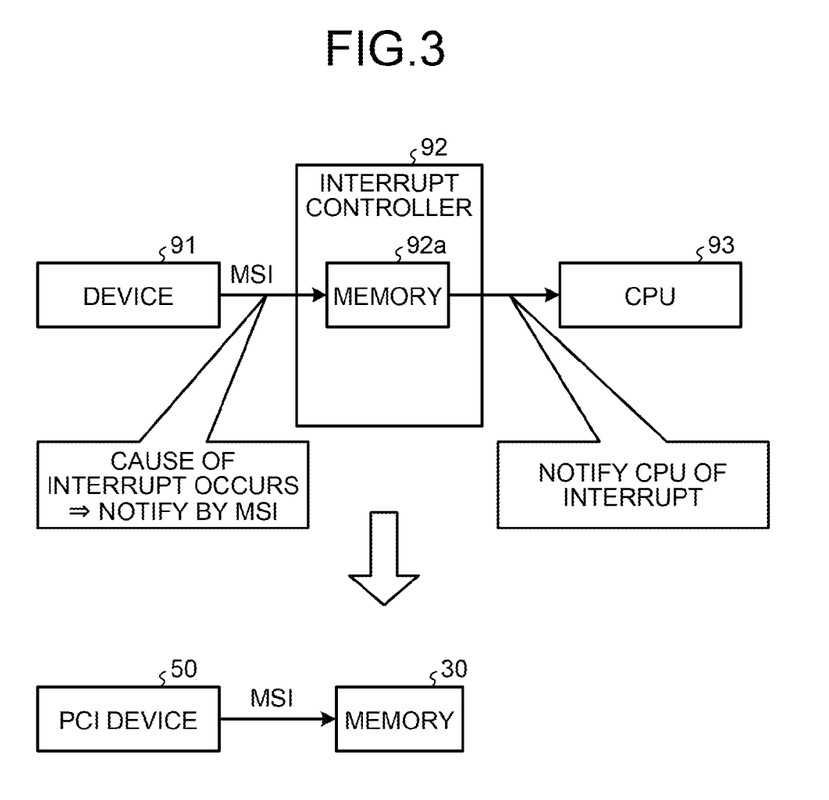
FIG. 3 is a diagram for explaining a write operation of an MSI message to a memory.

FIG. 3 is a diagram for explaining a write operation of the MSI message to the memory 30. As illustrated in FIG. 3, when a cause of interrupt occurs, in general, a device 91 that supports MSI writes the MSI message in a memory 92a included in an interrupt controller 92. Then, the interrupt controller 92 notifies the CPU 93 of the interrupt. In the RAID apparatus 1, a PCI device 50 writes the MSI message in an area specified by a specific address in the memory 30.

Let us return to FIG. 2. The polling routines 51 to 54 poll the memory 30 (3). The polling routines 51 to 54 perform the same processing, so that the processing of the polling routine 51 will be described in the description below.

When the polling routine 51 finds an MSI message, the polling routine 51 calls the interrupt processing handler 61a or 61b corresponding to a cause of interrupt included in the MSI message (4). Here, two interrupt processing handlers 61a and 61b are illustrated. However, there are interrupt processing handlers, the number of which is the same as the number of causes of interrupt.

Then, the interrupt processing handler 61a or 61b connects a command 80 corresponding to the cause of interrupt to a command queue 71a of the IO task 71 after interrupt processing (5). Then, the IO task 71 processes commands, beginning from a first command 80 in the command queue 71a (6). The command queue 71a is a queue in which the commands 80 are connected.

In this way, the polling routines 51 to 54 running on the CPU cores 21 to 24, respectively, poll all the MSI messages written to the memory 30. Therefore, the interrupt processing is not biased among the CPU cores 21 to 24 and it is possible to distribute the load of the interrupt processing.

When the PCI devices 50a and 50b write an MSI message to the memory 30 and the polling routines 51 to 54 poll the memory 30 and find the MSI message, the polling routines 51 to 54 call an interrupt processing handler. The clock of the CPU 20 is faster than the clock of the interrupt controller 92, so that the polling routines 51 to 54 run faster than the interrupt controller 92. Therefore, the control apparatus 2 can process the MSI faster than when using the interrupt controller 92, so that it is possible to improve the performance of the RAID apparatus 1.

Figure 4:
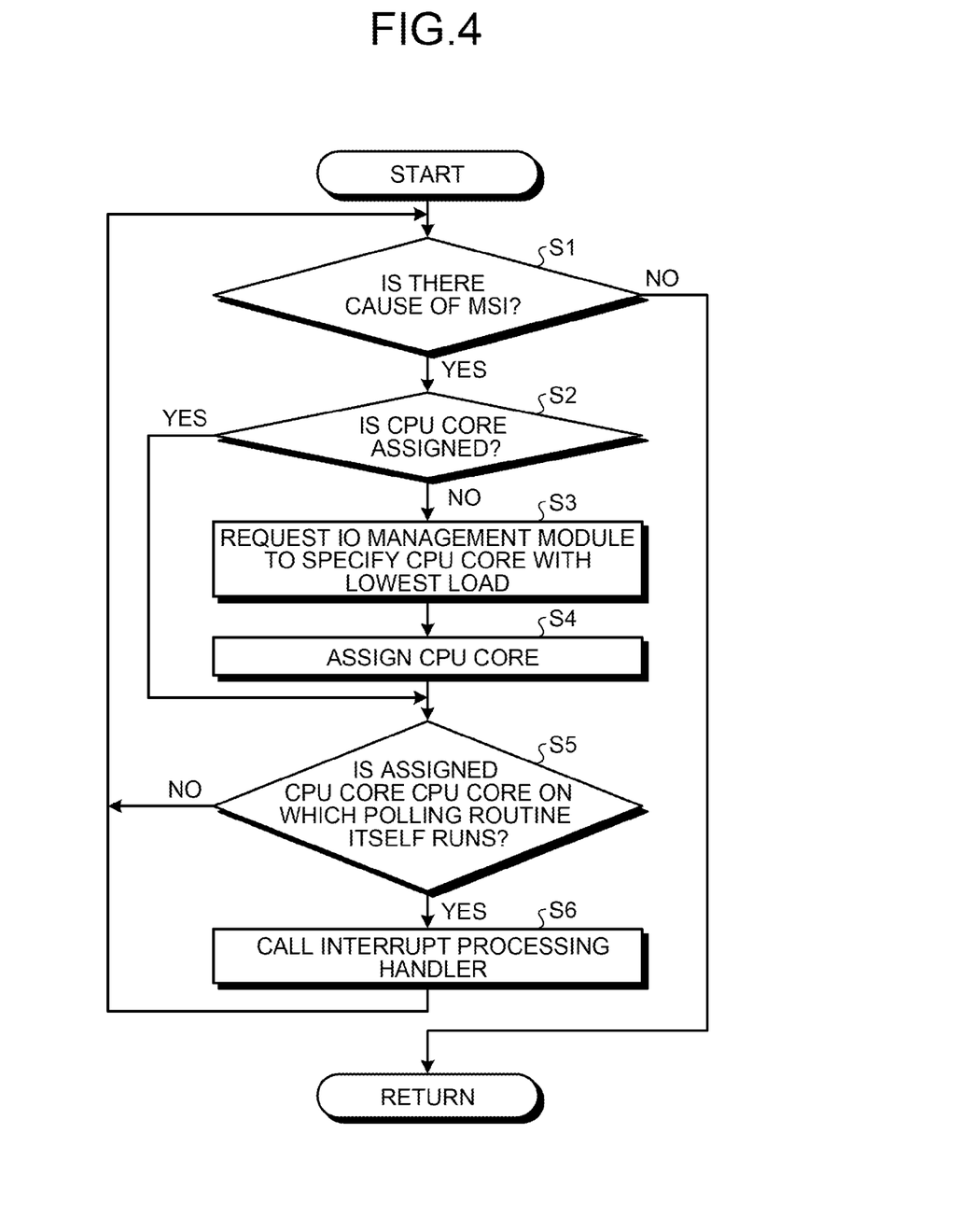
FIG. 4 is a flowchart illustrating a process flow of a polling routine.

Next, a process flow of the polling routine 51 will be described. FIG. 4 is a flowchart illustrating the process flow of the polling routine 51. Process flows of the polling routines 52 to 54 are the same as that of the polling routine 51.

As illustrated in FIG. 4, the polling routine 51 polls the memory 30 and determines whether or not there is a cause of MSI, that is, the MSI message (step S1). As a result, if there is no cause of MSI, the polling routine 51 ends the process.

In contrast, if there is a cause of MSI, the polling routine 51 determines whether or not a CPU core that processes the interrupt is assigned (step S2). As a result, if a CPU core is assigned, the polling routine 51 proceeds to step S5. Here, the case in which the CPU core is assigned is, for example, a case in which a specific cause of interrupt is to be processed by a specific CPU core and a case in which a CPU core is assigned by a polling routine running on another CPU core.

If no CPU core is assigned, the polling routine 51 requests an IO management module to specify a CPU core with the lowest load (step S3) and assigns the interrupt processing to the specified CPU core (step S4).

Here, the IO management module is a module that manages the command processing. For example, the IO management module adds a score (low load: 0, intermediate load: 1, high load: 2, and the like) related to a processing load for each CPU core on the basis of a command type when connecting a command to the command queue and subtracts the score when processing the command. The IO management module specifies a CPU core with the lowest score as the CPU core with the lowest load.

Then, the polling routine 51 determines whether or not the assigned CPU core is the CPU core on which the polling routine 51 itself runs (step S5). If the assigned CPU core is not the CPU core on which the polling routine 51 itself runs, the polling routine 51 returns to step S1 and processes the next cause of MSI.

In contrast, if the assigned CPU core is the CPU core on which the polling routine 51 itself runs, the polling routine 51 calls the interrupt processing handler 61a or 61b based on the cause of interrupt (step S6), returns to step S1, and processes the next cause of MSI.

In this way, the polling routine 51 assigns the interrupt processing to the CPU core with the lowest load, so that it is possible to equalize the load among the CPU cores.

Next, communication between the IO tasks will be described. A semaphore is used for synchronization and communication between the tasks. Specifically, a transmitting side task transfers a semaphore to a receiving side task, and thereby the synchronization and the communication between the tasks are performed.

However, when a plurality of CPU cores is used in the SMP method, if the communication is performed by using the semaphore, a CPU core performs inter-CPU-core communication to know states of other CPU cores. Specifically, when a task acquires a semaphore, the CPU core performs the inter-CPU-core communication to validate other CPU cores whether or not the task may be run. Therefore, in the SMP method, semaphore performance degrades and it affects the performance of the apparatus.

Figure 5A:
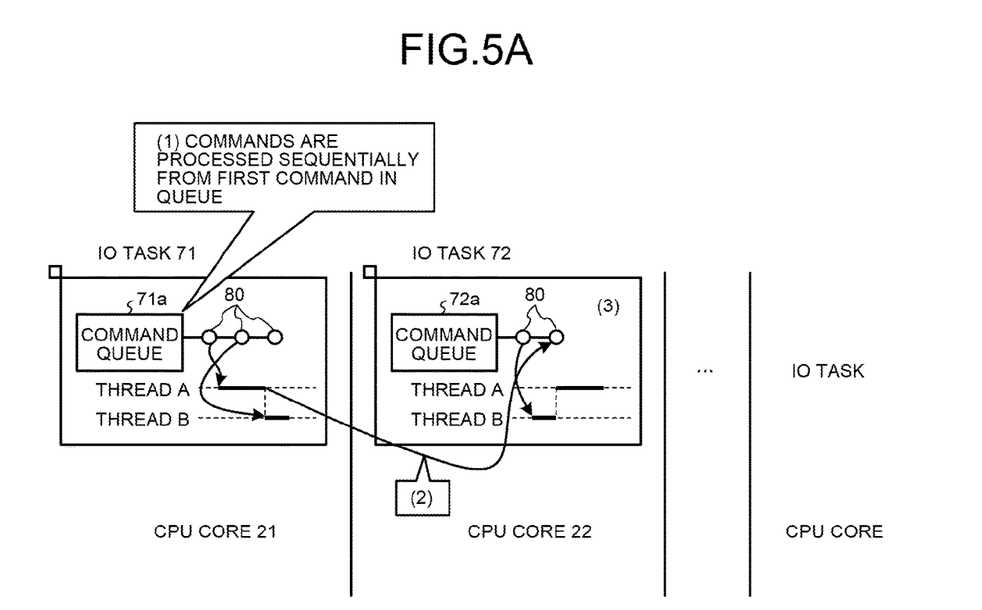
FIG. 5A is a diagram for explaining inter-task communication (normal communication) using a command queue.
Figure 5B:
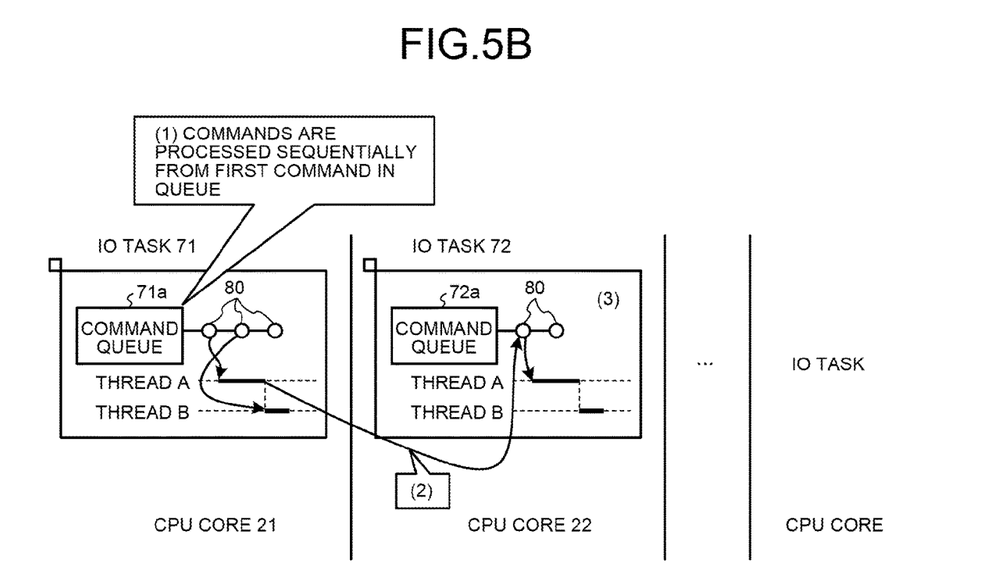
FIG. 5B is a diagram for explaining inter-task communication (high-speed communication) using a command queue.

Therefore, the control apparatus 2 performs inter-task communication without using a semaphore. The control apparatus 2 performs the inter-task communication using the command queue. FIGS. 5A and 5B are diagrams for explaining the inter-task communication using the command queue. FIG. 5A illustrates a case of normal communication and FIG. 5B illustrates a case of high-speed communication faster than the normal communication.

As illustrated in FIG. 5A, the IO task 71 sequentially processes commands from the first command in the command queue 71a (1). Here, the IO task 71 is divided into a plurality of threads that share context (register space, mapping, stack, and the like) in the task to increase the speed of processing and is executed by the CPU core 21.

When a task is switched, the entire context for the task needs to be switched, so that a delay occurs when the task is switched. Meanwhile, when a thread is switched, the context need not be switched, so that it is possible to switch a thread more quickly than switching a task.

A thread by which a command is processed is determined in advance and the command has information of the thread by which the command is processed as a destination thread. In FIG. 5A, the first command 80 in the command queue 71a is processed by the thread A and the second command 80 in the command queue 71a is processed by the thread B.

In other words, the first command 80 in the command queue 71a has the thread A as the information of the destination thread and the second command 80 in the command queue 71a has the thread B as the information of the destination thread.

Each task includes a thread scheduler that schedules threads and a command queue in the task. The thread scheduler is different from the task scheduler included in the OS. The thread scheduler calls the destination threads of the commands in a connection order in the command queue and starts processing of the next command after processing of one command in the thread is completed.

Figure 6:
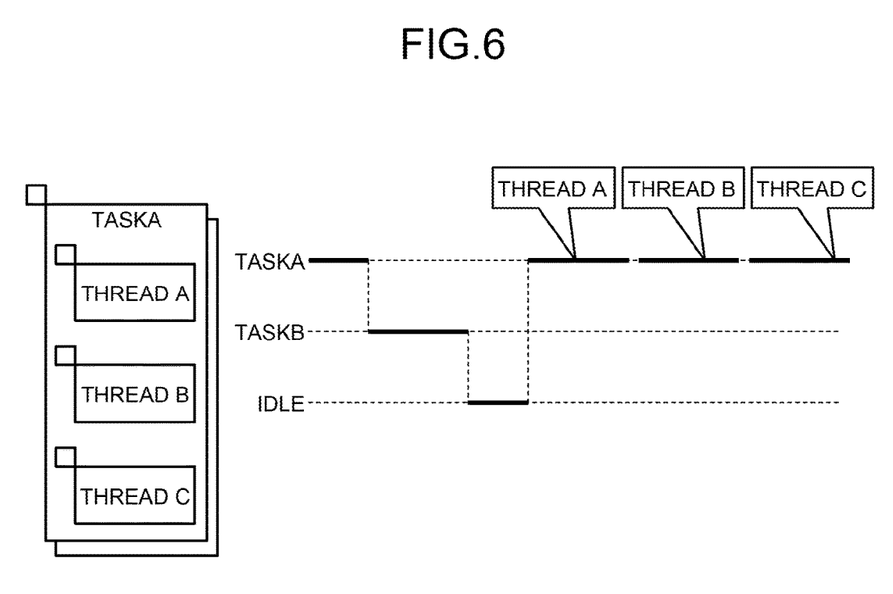
FIG. 6 is a diagram illustrating an example of scheduling of threads.

FIG. 6 is a diagram illustrating an example of scheduling of the threads. As illustrated in FIG. 6, the task A which is divided into the thread A, the thread B, and the thread C and executed by a CPU core is scheduled by the OS along with another task B.

Meanwhile, the thread A, the thread B, and the thread C are scheduled by the thread scheduler in the task A, and the thread A, the thread B, and the thread C are executed in this order in the example illustrated in FIG. 6.

Let us return to FIG. 5A. When a requirement to communicate with an IO task 72 occurs during the command processing, the thread A connects the command 80 to the end of the command queue 72a of the IO task 72 (2). After executing the thread B of the IO task 72, the thread A of the IO task 72 executes the command 80 that is connected to the end of the command queue 72a of the IO task 72 by the thread A of the IO task 71 (3), so that the inter-task communication using the command queue is realized.

Then, in FIG. 5B, when a requirement to communicate with the IO task 72 occurs during the command processing, the thread A of the IO task 71 connects the command 80 to the head of the command queue 72a of the IO task 72 (2).

Therefore, before executing the thread B of the IO task 72, the thread A of the IO task 72 executes the command 80 that is connected to the head of the command queue 72a of the IO task 72 by the thread A of the IO task 71 (3). Therefore, the inter-task communication illustrated in FIG. 5B can realize inter-task communication faster than the inter-task communication illustrated in FIG. 5A.

Here, a case in which the command queue is used for the inter-IO-task communication is described. However, the interrupt processing handler illustrated in FIG. 2 performs communication with the IO task by using the command queue by connecting the command to the command queue. In other words, the communication using the command queue is also used for the communication between the interrupt processing handler and the task.

Figure 7A:
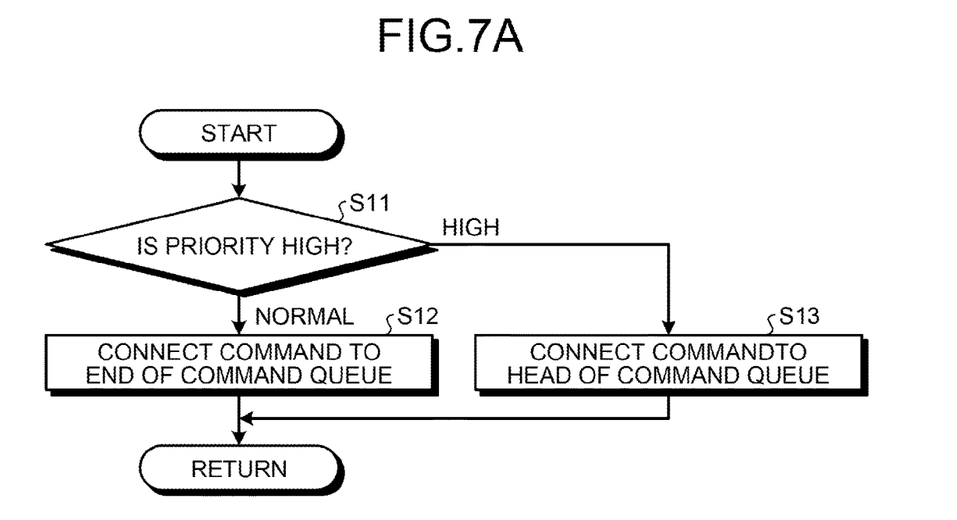
FIG. 7A is a flowchart illustrating a process flow of a transmitting side of inter-task communication using a command queue.
Figure 7B:
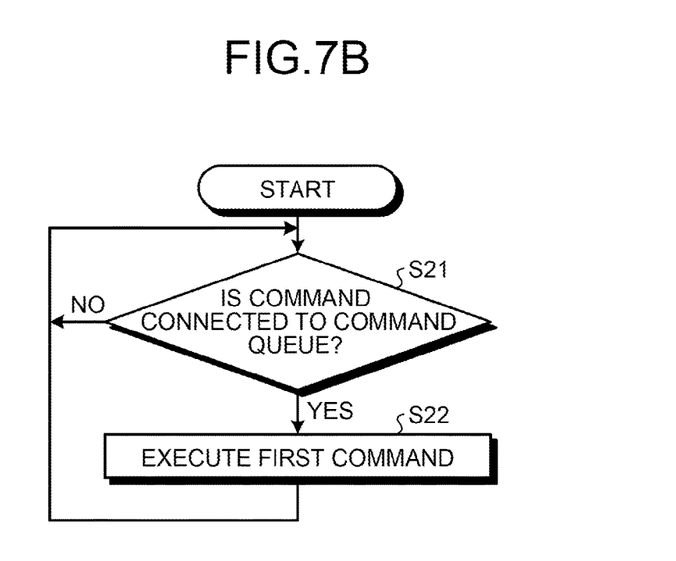
FIG. 7B is a flowchart illustrating a process flow of a receiving side of inter-task communication using a command queue.

Next, a process flow of the inter-task communication using the command queue will be described. FIG. 7A is a flowchart illustrating a process flow of a transmitting side of the inter-task communication using the command queue. FIG. 7B is a flowchart illustrating a process flow of a receiving side of the inter-task communication using the command queue.

When a requirement for a task on the transmitting side to communicate with another task occurs during command processing, as illustrated in FIG. 7A, the task on the transmitting side determines whether or not the priority of the communication is high (step S11). As a result, if the priority of the communication is not high, that is to say, if the communication is the normal communication, the task on the transmitting side connects a command to the end of the command queue of the task of the communication destination (step S12).

In contrast, if the priority of the communication is high, that is to say, if the communication is the high-speed communication, the task on the transmitting side connects the command to the head of the command queue of the task of the communication destination (step S13).

In this way, the task on the transmitting side connects the command to the command queue of the task of the communication destination, so that it is possible to realize the inter-task communication using the command queue.

As illustrated in FIG. 7B, the task on the receiving side determines whether or not a command is connected to the command queue in the task (step S21). As a result, if no command is connected to the command queue, the task on the receiving side repeats step S21 until a command is connected to the command queue.

In contrast, if a command is connected to the command queue, the task on the receiving side executes the first command in the command queue (step S22) and returns to step S21.

In this way, the task on the receiving side executes the command that is connected to the command queue by the task on the transmitting side, so that it is possible to realize the inter-task communication using the command queue.

Figure 8A:
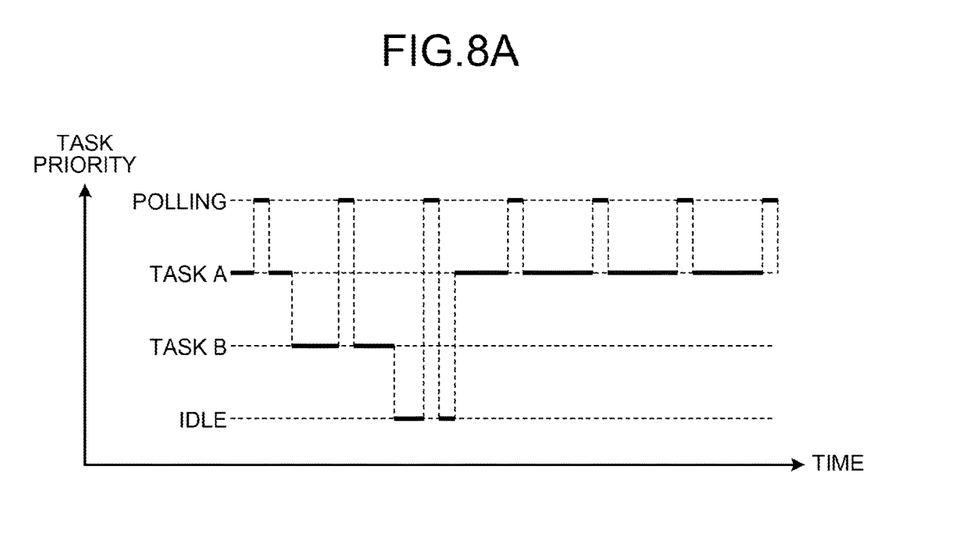
FIG. 8A is a diagram for explaining a general interrupt polling method.
Figure 8B:
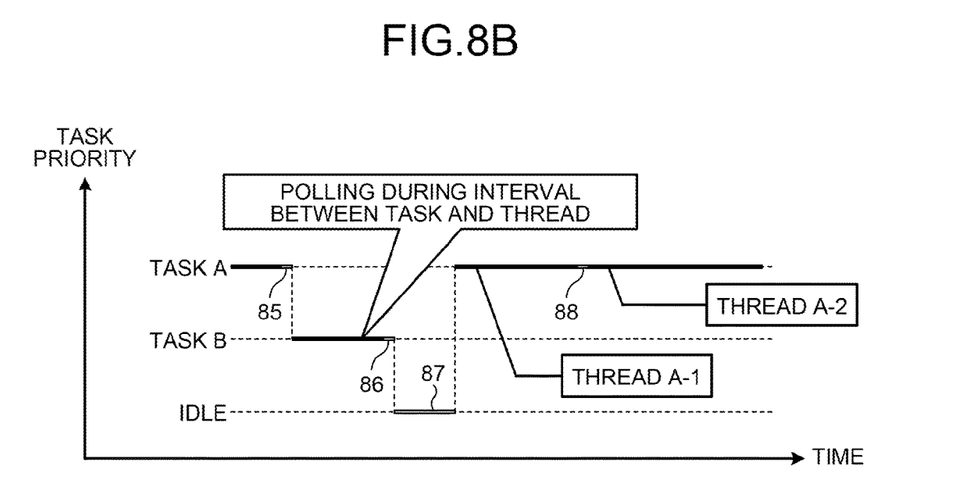
FIG. 8B is a diagram for explaining a polling method performed by a polling routine according to the embodiment.

Next, a polling method of a cause of interrupt performed by each polling routine will be described. FIG. 8A is a diagram for explaining a general interrupt polling method. FIG. 8B is a diagram for explaining a polling method performed by a polling routine according to the embodiment.

As illustrated in FIG. 8A, generally, the polling is performed by a periodic timer interrupt. Here, the polling process performed by the timer interrupt is performed at the highest priority. However, the interrupt polling method has a problem that it takes time from when a cause of interrupt occurs to when the cause of interrupt is detected if a cycle of checking is long and the load of CPU increases and other processing is hindered if the cycle of checking is short.

Therefore, the polling routine according to the embodiment does not perform polling by a periodic timer interrupt, but polls a cause of interrupt during an interval between tasks, during an interval between threads, and during idle as illustrated in FIG. 8B by utilizing characteristics of the real-time OS.

Therefore, the polling routine according to the embodiment can effectively check the cause of interrupt without using an interrupt resource and the interrupt controller 92 while securing the real-time characteristics of interrupt.

In FIG. 8B, the polling is performed during an interval 85 between the task A and the task B, during an interval 86 between the task B and idle, during idle 87, during an interval 88 between the thread A-1 and thread A-2.

As described above, in the embodiment, the PCI devices 50*a* and 50*b* write the MSI message to the memory 30 and the polling routines 51 to 54, which are performed by the CPU cores 21 to 24 respectively, poll the memory 30. Therefore, the control apparatus 2 can process the interrupt by effectively using all the CPU cores 21 to 24.

Further, in the embodiment, the polling routines 51 to 54 poll a cause of interrupt during an interval between tasks, during an interval between threads, and during idle. Therefore, the control apparatus 2 can effectively process the interrupt while securing the real-time characteristics of the interrupt.

Further, in the embodiment, the polling routines 51 to 54 cause the CPU core with the lowest load to perform the interrupt processing. Therefore, the control apparatus 2 can equalize the load of the CPU cores 21 to 24.

Further, in the embodiment, the IO tasks 71 to 74 perform the inter-task communication with another IO task by using the command queue. Therefore, the control apparatus 2 can perform communication between IO tasks without using semaphore and can perform inter-IO-task communication without negatively affecting the performance of the RAID apparatus 1.

In the embodiment, a case is described in which a plurality of polling routines running respectively on a plurality of CPU cores included in the CPU perform polling. However, the present invention is not limited to this, and for example, the present invention can be applied in the same manner to a case in which a plurality of polling routines running respectively on a plurality of processing apparatuses such as a plurality of CPUs including a single core perform polling.

Further, in the embodiment, the RAID apparatus is described. However, the present invention is not limited to this, and the present invention can be applied in the same manner to other apparatuses that use a CPU including a plurality of CPU cores such as a control apparatus of another storage apparatus.

In the embodiment, the control apparatus 2 is described. The control apparatus 2 is realized by CPU cores executing a control program including a polling routine and an interrupt processing handler. The control program executed by the CPU core is stored in a digital versatile disk (DVD), read from the DVD, and installed in the control apparatus 2. Alternatively, the control program is stored in a database or the like in a computer system connected through a network, read from the database or the like, and installed in the control apparatus 2. The installed control program is read into the memory 30 and executed by the CPU core.

According to an embodiment, it is possible to provide a control apparatus that effectively uses a plurality of processing apparatuses.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control apparatus comprising:
   a plurality of processing apparatuses being accessible to a memory that is a notification destination of interrupt, each of the plurality of processing apparatuses configured to
   perform polling the memory to detect a interrupt message written by a notification source of interrupt in the memory, if the interrupt message is detected, a processing apparatus assigned as a processing apparatus to process interrupt processing corresponding to a cause of interrupt included in the interrupt message from the plurality of processing apparatuses performs the interrupt processing corresponding to the cause of interrupt,
   a task executed in each processing apparatus includes a queue to which a command to be processed is connected,
   the interrupt processing connects a command corresponding to each cause of interrupt to the queue, and
   when a requirement for a first task to communicate with a second task occurs while the first task is processing a command, the first task on a transmitting side connects the command to a queue of the second task on a destination side.

2. The control apparatus according to claim 1, wherein the process of the polling to detect the interrupt message is performed during an interval between units of processing.

3. The control apparatus according to claim 2, wherein the unit of processing is a task or a thread.

4. The control apparatus according to claim 1, wherein
   a processing apparatus that detects the interrupt message determines a processing apparatus that processes interrupt processing corresponding to a cause of interrupt, and
   the determined processing apparatus performs the interrupt processing.

5. The control apparatus according to claim 1, wherein the first task on the transmitting side determines whether or not a priority of the communication between the first task and the second task on the destination side is high,
   if the priority of the communication is not high, the first task connects a command to the end of the queue on the second task,
   if the priority of the communication is high, communication, the first connects the command to the head of the queue of the second task.

6. A control method of a control apparatus including a plurality of processing apparatuses being accessible to a memory that is a notification destination of interrupt, the control method comprising:

performing, by the processing apparatuses, polling the memory to detect a interrupt message written by a notification source of interrupt in the memory; and performing, by a processing apparatus assigned as a processing apparatus to process, interrupt processing corresponding to a cause of interrupt included in the interrupt message from the plurality of processing apparatuses if the interrupt message is detected, the interrupt processing corresponding to the cause of interrupt, a task executed in each processing apparatus includes a queue to which a command to be processed is connected, the interrupt processing connects a command corresponding to each cause of interrupt to the queue, and when a requirement for a first task to communicate with a second task occurs while the first task is processing a command, the first task on a transmitting side connects the command to a queue of the second task on a destination side.

7. A non-transitory computer-readable storage medium having stored therein a control program executed by a control apparatus including a plurality of computers being accessible to a memory that is a notification destination of interrupt, the control program causing the computers to execute a process comprising:

performing polling the memory to detect a interrupt message written by a notification source of interrupt in the memory; and causing a computer assigned as a computer to process interrupt processing corresponding to a cause of interrupt included in the interrupt message from the plurality of computers if the interrupt message is detected, performing interrupt processing corresponding to the cause of interrupt, a task executed in each processing apparatus includes a queue to which a command to be processed is connected, the interrupt processing connects a command corresponding to each cause of interrupt to the queue, and when a requirement for a first task to communicate with a second task occurs while the first task is processing a command, the first task on a transmitting side connects the command to a queue of the second task on a destination side.

8. The non-transitory computer-readable storage medium to claim 7, wherein the first task on the transmitting side determines whether or not a priority of the communication between the first task and the second task on the destination side is high, if the priority of the communication is not high, the first task connects a command to the end of the queue on the second task, if the priority of the communication is high, communication, the first connects the command to the head of the queue of the second task.

9. A control apparatus comprising:

a plurality of processing apparatuses being accessible to a memory that is a notification destination of interrupt, all the plurality of processing apparatuses configured to perform polling the memory to detect a cause of interrupt notified by being written in the memory without a interrupt notification to the processing apparatuses, if the cause of interrupt is detected, a processing apparatus that detects the cause of interrupt determines a processing apparatus that processes interrupt processing corresponding to the cause of interrupt, and the determined processing apparatus performs the interrupt processing, a task executed in each processing apparatus includes a queue to which a command to be processed is connected, the interrupt processing connects a command corresponding to each cause of interrupt to the queue, and when a requirement for a first task to communicate with a second task occurs while the first task is processing a command, the first task on a transmitting side connects the command to a queue of the second task on a destination side.

10. The control apparatus according to claim 9, wherein the first task on the transmitting side determines whether or not a priority of the communication between the first task and the second task on the destination side is high, if the priority of the communication is not high, the first task connects a command to the end of the queue on the second task, if the priority of the communication is high, communication, the first connects the command to the head of the queue of the second task.

\* \* \* \* \*